(12) United States Patent
Charoulet et al.

(10) Patent No.: US 12,420,664 B2
(45) Date of Patent: Sep. 23, 2025

(54) METHOD AND SYSTEM FOR MANAGING MILEAGE CAPACITY OF A BATTERY ELECTRIC VEHICLE (BEV)

(71) Applicant: Carrier Corporation, Palm Beach Gardens, FL (US)

(72) Inventors: Guillaume Charoulet, Rouen (FR); Florian Beaufrere, Rouen (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/457,096

(22) Filed: Aug. 28, 2023

(65) Prior Publication Data
US 2024/0075848 A1 Mar. 7, 2024

Related U.S. Application Data

(60) Provisional application No. 63/374,289, filed on Sep. 1, 2022.

(51) Int. Cl.
*B60H 1/00* (2006.01)
*B60H 1/32* (2006.01)
(Continued)

(52) U.S. Cl.
CPC .......... *B60L 58/13* (2019.02); *B60H 1/00392* (2013.01); *B60H 1/00428* (2013.01);
(Continued)

(58) Field of Classification Search
CPC .......... B60L 58/13; B60L 58/16; B60L 1/003; B60L 1/02; B60L 15/2045;
(Continued)

(56) References Cited

U.S. PATENT DOCUMENTS 6,362,602 B1 3/2002 Kozarekar
8,849,499 B2 9/2014 Profitt-Brown et al.
(Continued)

FOREIGN PATENT DOCUMENTS

CN 102452324 B 4/2016
CN 112721785 A 4/2021

OTHER PUBLICATIONS

Extended European Search Report received for EP Application No. 23194856.3, mailed on Feb. 15, 2024, 8 Pages.

*Primary Examiner* — Rexford N Barnie
*Assistant Examiner* — Xuan Ly
(74) *Attorney, Agent, or Firm* — Drew Folgmann (57) ABSTRACT

A method for managing mileage capacity of a BEV having a TRU includes obtaining live vehicle data via an ECU of the BEV and determining a rate of consumption of energy stored in the energy storage unit and an efficiency of BEV's components based on the live vehicle data. The method further includes triggering an operation mode of the BEV based on the determined rate of consumption of energy and the efficiency, and thereafter controlling a cooling and a heating capacity of the TRU based on the triggered operation mode. The method includes optimizing the rate of the consumption of energy based on the controlled cooling and the heating capacity of the TRU and then notifying a message indicating current operating modes of the BEV and activation of an energy saving mode to a user of the BEV via one of a HMI, mobile application, or a visual indicator.

20 Claims, 6 Drawing Sheets

(51) Int. Cl.
*B60L 1/00* (2006.01)
*B60L 15/20* (2006.01)
*B60L 58/13* (2019.01)
*B60L 58/14* (2019.01)
*B60L 58/16* (2019.01)
*B60H 1/22* (2006.01)

(52) U.S. Cl.
CPC ..... *B60H 1/00764* (2013.01); *B60H 1/00878* (2013.01); *B60H 1/00985* (2013.01); *B60H 1/3211* (2013.01); *B60H 1/3232* (2013.01); *B60L 58/16* (2019.02); *B60H 2001/224* (2013.01); *B60H 1/3228* (2019.05); *B60H 2001/3272* (2013.01); *B60L 1/003* (2013.01)

(58) Field of Classification Search
CPC .. B60L 2260/42; B60L 2260/52; B60L 58/14; B60L 2200/36; B60L 2240/12; B60L 2240/14; B60L 2240/36; B60L 2240/547; B60L 2240/549; B60L 2250/10; B60L 2250/16; B60L 2250/18; B60L 2260/26; B60L 2260/54; B60L 3/12; B60L 1/00; B60L 15/20; B60H 1/00392; B60H 1/00428; B60H 1/00764; B60H 1/00878; B60H 1/00985; B60H 1/3211; B60H 1/3232; B60H 1/3228; B60H 2001/224; B60H 2001/3272; B60H 1/3208; B60H 1/00378; B60H 1/3205; B60H 1/00; B60H 1/32
USPC .......................................................... 307/9.1
See application file for complete search history.

(56) References Cited

U.S. PATENT DOCUMENTS

| | | | |
|---|---|---|---|
| 9,868,336 | B2 | 1/2018 | Viegas et al. |
| 9,878,631 | B2 | 1/2018 | Hyde et al. |
| 10,315,495 | B2 | 6/2019 | Vehr et al. |
| 11,022,451 | B2 | 6/2021 | Srnec et al. |
| 11,072,321 | B2 | 7/2021 | Wenger et al. |
| 11,085,782 | B2 | 8/2021 | Adetola et al. |
| 11,155,143 | B2 | 10/2021 | Adetola et al. |
| 11,192,451 | B2 | 12/2021 | Schumacher et al. |
| 11,273,684 | B2 | 3/2022 | Holmstrom et al. |
| 2015/0298555 | A1* | 10/2015 | Bennett ............... B60L 58/13 701/22 |
| 2018/0029436 | A1* | 2/2018 | Zaeri ..................... B60H 1/004 |
| 2019/0242716 | A1 | 8/2019 | N et al. |
| 2020/0207184 | A1 | 7/2020 | Schumacher et al. |
| 2021/0268865 | A1 | 9/2021 | Saroka et al. |
| 2021/0347351 | A1* | 11/2021 | Wenger ................ B60W 20/12 |
| 2022/0072931 | A1 | 3/2022 | Chen et al. |

\* cited by examiner

FIG. 1 (Prior-Art)

METHOD AND SYSTEM FOR MANAGING MILEAGE CAPACITY OF A BATTERY ELECTRIC VEHICLE (BEV)

CROSS REFERENCE TO RELATED APPLICATIONS

This application claims the benefit of U.S. Provisional Patent Application No. 63/374,289 filed on Sep. 1, 2022, which is incorporated by reference herein in its entirety.

FIELD OF THE INVENTION

The disclosure relates to the field of Battery Electrical Vehicles (BEVs). In particular, the disclosure relates to a method and system for managing mileage capacity of the BEV.

BACKGROUND

Refrigeration units in transportation trucks have been driven by thermal engines and therefore those refrigeration units cannot communicate with live truck data. On the other hand, electrical refrigeration units in electrical transportation trucks might be directly connected to the truck batteries and can reduce the mileage autonomy of the BEVs.

It would be advantageous to provide a method and system that may automatically optimize the autonomy of the BEVs having the refrigeration units.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

Disclosed herein is a method for managing mileage capacity of a BEV having a transport refrigeration unit (TRU). The method includes obtaining live vehicle data via an electronic control unit (ECU) of the BEV. The live vehicle data includes at least a state of charge of an energy storage unit of the BEV, a state of available energy in the energy storage unit, a power limitation maximum current and a power limitation maximum voltage of the energy storage unit, a live speed of the BEV, cruise control information associated with the BEV, health status of the energy storage unit, and power drawn by the BEV on the energy storage unit. The method further includes determining a rate of consumption of energy stored in the energy storage unit and an efficiency of BEV's components based on the obtained live vehicle data and triggering an operation mode among a plurality of operation modes of the BEV based on each of the determined rate of consumption of energy and the determined efficiency of the BEV's components. The method further includes controlling a cooling and a heating capacity of the TRU based on the triggered operation mode and optimizing the rate of the consumption of energy based on the controlled cooling and the heating capacity of the TRU. Once the rate of the consumption of energy is optimized, the method further includes notifying a message via one of a human machine interface (HMI), a mobile application, or a visual indicator connected to the TRU indicating current operating modes of the BEV and activation of an energy saving mode of the BEV.

In one or more embodiments, the method may further include controlling, based on the triggered operation mode, a speed of at least one of a cooling compressor, a cooling fan, or a heating device included in the TRU and thereafter optimizing the rate of the consumption of energy based on the controlled speed of the at least one cooling compressor, the cooling fan, or the heating device.

In one or more embodiments, the method may further include controlling a change in a temperature accuracy setting of the TRU based on the triggered operation mode and thereafter optimizing the rate of the consumption of energy based on the controlled change in the temperature accuracy setting of the TRU.

In one or more embodiments, the change in the temperature accuracy setting of the TRU may correspond to a change in a regulation range of the at least one of a cooling compressor or a heating device of the TRU above a setpoint within an acceptable setting predefined by a user of the BEV.

In one or more embodiments, the plurality of operation modes may include at least one of a derated operation mode or a critical operation mode.

In one or more embodiments, the notified message may further indicate an action to be taken by a user while driving the BEV. The action indicated by the notified message may correspond to at least one of an indication of a reduction of the live speed of the BEV, an indication to recharge the energy storage unit, or an indication of a warning regarding spoilage of goods kept in a refrigeration compartment of the TRU due to the optimized rate of the consumption of energy.

In one or more embodiments, the cooling and the heating capacity of the TRU may be controlled such that a coefficient of performance (COP) of the TRU is improved in one or more operating modes of the BEV or is decreased in a critical operation mode of the BEV.

In on one or more embodiments, the cruise control information may correspond to information related to at least a rate of acceleration of the BEV, a braking pattern associated with the brakes applied by the user, and a driving mode of the BEV that is set by the user.

In one or more embodiments, the method may further includes adjusting a balance between temperature management of the TRU and autonomy of the BEV by adapting to the COP.

In one or more embodiments, the method may further includes notifying the message the mobile application using a telematic connection.

Also disclosed is a system for managing mileage capacity of a BEV that includes an electronic control unit (ECU) including a transceiver and at least one controller, an energy storage unit including one or more batteries, and a TRU. The at least one controller is configured to obtain live vehicle data via the transceiver of the ECU. The live vehicle data includes at least a state of charge of the energy storage unit, a state of available energy in the energy storage unit, a Power limitation maximum current and a power limitation maximum voltage of the energy storage unit, a live speed of the BEV, cruise control information associated with the BEV, health status of the energy storage unit, and power drawn the BEV on the energy storage unit. The at least one controller is further configured to determine a rate of consumption of energy stored in the energy storage unit and an efficiency of BEV's components based on the obtained live vehicle data and trigger an operation mode among a plurality of operation modes of the BEV based on each of the determined rate of consumption of energy and the determined efficiency of the BEV components. Once the operation mode is triggered, thereafter the at least one controller is further configured to control a cooling and a heating capacity of the TRU based on the triggered operation mode and optimize the rate of the consumption of energy based on the controlled cooling and the heating capacity of the TRU. Once the rate of the consumption of energy is optimized, a message indicating current operating modes of the BEV and activation of an energy saving mode is notified by the at least one controller via one of a human machine interface (HMI), a mobile application, or a visual indicator connected to the TRU.

In one or more embodiments, the at least one controller may be further configured to control, based on the triggered operation mode, a speed of at least one of a cooling compressor, a cooling fan, or a heating device included in the TRU and thereafter may optimize the rate of the consumption of energy based on the controlled speed of the at least one cooling compressor, the cooling fan, or the heating device.

In one or more embodiments, the at least one controller may be further configured to control a change in a temperature accuracy setting of the TRU based on the triggered operation mode and thereafter may optimize the rate of the consumption of energy based on the controlled change in the temperature accuracy setting of the TRU.

In one or more embodiments, the change in the temperature accuracy setting of the TRU corresponds to a change in a regulation range of the at least one of a cooling compressor or a heating device of the TRU above a setpoint within an acceptable setting predefined by a user of the BEV.

In one or more embodiments, the plurality of operation modes includes at least one of a derated operation mode or a critical operation mode.

In one or more embodiments, the notified message may further indicate an action to be taken by a user while driving the BEV. The action indicated by the notified message may correspond to at least one of an indication of a reduction of the live speed of the BEV, an indication to recharge the energy storage unit, or an indication of a warning regarding spoilage of goods kept in a refrigeration compartment of the TRU due to the optimized rate of the consumption of energy.

In one or more embodiments, the at least one controller may be further configured to control the cooling and the heating capacity of the TRU such that a coefficient of performance (COP) of the TRU is improved in one or more operating modes of the BEV or is decreased in a critical operation mode of the BEV.

In one or more embodiments, the at least one controller may be further configured to adjust a balance between temperature management of the TRU and autonomy of the BEV by adapting to the COP.

In on one or more embodiments, the cruise control information may correspond to information related to at least a rate of acceleration of the BEV, a braking pattern associated with the brakes applied by the user, and a driving mode of the BEV that is set by the user.

To further clarify the advantages and features of the method and system, a more particular description of the method and system will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the invention. Furthermore, in terms of the construction of the device, one or more components of the device may have been represented in the drawings by conventional symbols, and the drawings may show only those specific details that are pertinent to understanding the embodiments of the invention so as not to obscure the drawings with details that will be readily apparent to those of ordinary skill in the art having the benefit of the description herein.

DETAILED DESCRIPTION

It should be understood at the outset that although illustrative implementations of embodiments are illustrated below, system and method may be implemented using any number of techniques. The disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "one, or more than one, or all." Accordingly, the terms "one," "more than one," but not all" or "all" would all fall under the definition of "some." The term "some embodiments" may refer to no embodiments or one embodiment or several embodiments or all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "have" and grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "must comprise" or "needs to include."

The term "unit" used herein may imply a unit including, for example, one of hardware, software, and firmware or a combination of two or more of them. The "unit" may be interchangeably used with a term such as logic, a logical block, a component, a circuit, and the like. The "unit" may be a minimum system component for performing one or more functions or may be a part thereof.

Unless otherwise defined, all terms, and especially any technical and/or scientific terms, used herein may be taken to have the same meaning as commonly understood by one having ordinary skill in the art.

Embodiments will be described below in detail with reference to the accompanying drawings.

Figure 1:
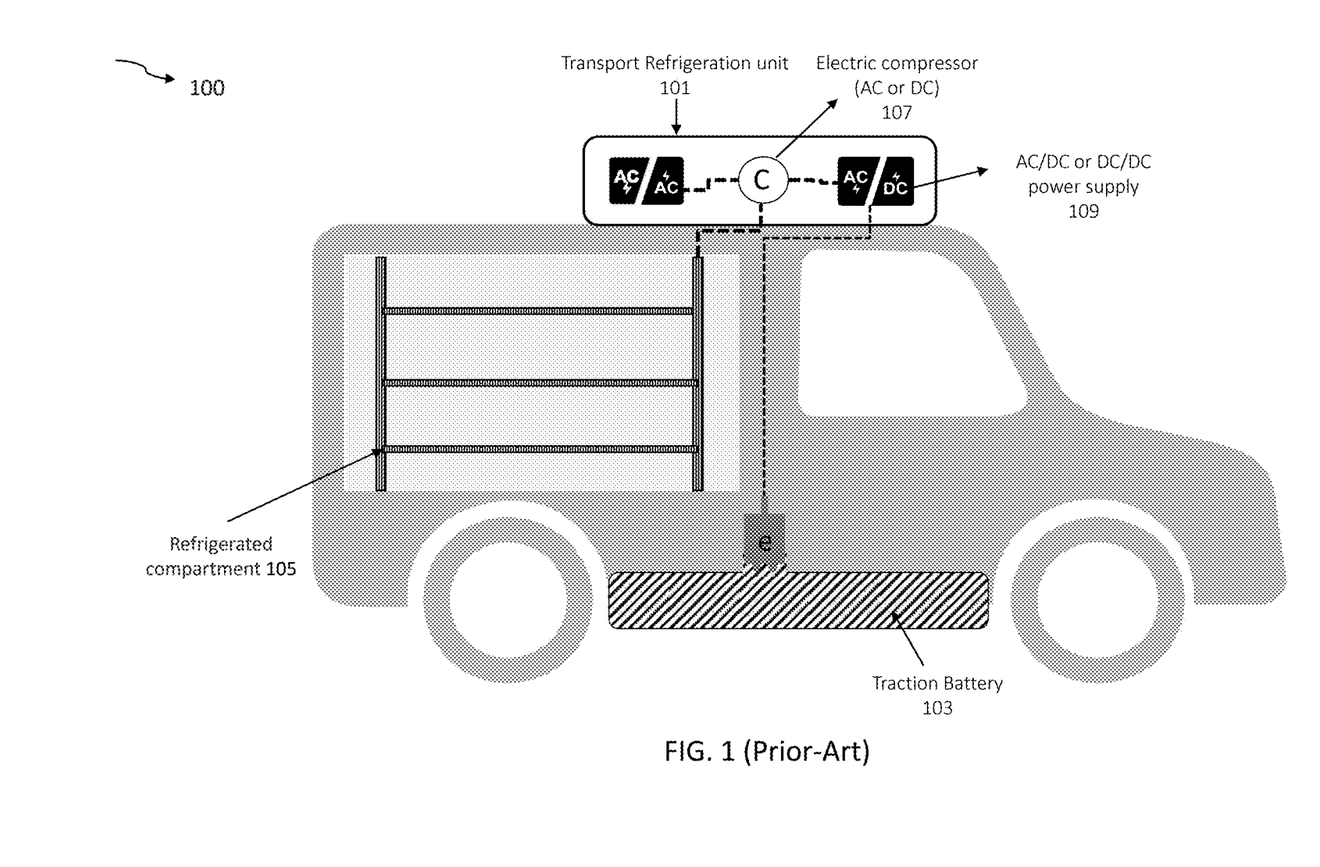
FIG. 1 illustrates a battery electric vehicle (BEV) with a transport refrigeration unit (TRU), in accordance with a conventional art.

FIG. 1 illustrates a battery electric vehicle (BEV) 100 with a transport refrigeration unit (TRU) 101, in accordance with a conventional art. The BEV 100 is a conventional battery electric vehicle, comprising a traction battery 103 for providing motive power to the BEV 100 during a driving mode of operation of the BEV 100.

The traction battery 103 is configured to provide power to the BEV 100 during the driving period, such as a time period of up to 5 to 10 hours, or a distance range of 50 to 300 miles depending on the capacity of the traction battery 103. The traction battery 103 is configurable to be charged when connected to a power source. The BEV 100 further comprises a refrigerated compartment 105. The TRU 101 comprises an electric compressor 107 and the TRU 101 is configured to cool the refrigerated compartment 105 using the electric compressor 107.

During the driving mode of operation of the BEV 100, when the traction battery 103 provides motive power to the BEV 100, the traction battery 103 also provides power to the TRU 101 through a power supply 109, so that the TRU 101 can maintain a temperature of the refrigerated compartment 105.

Figure 2:
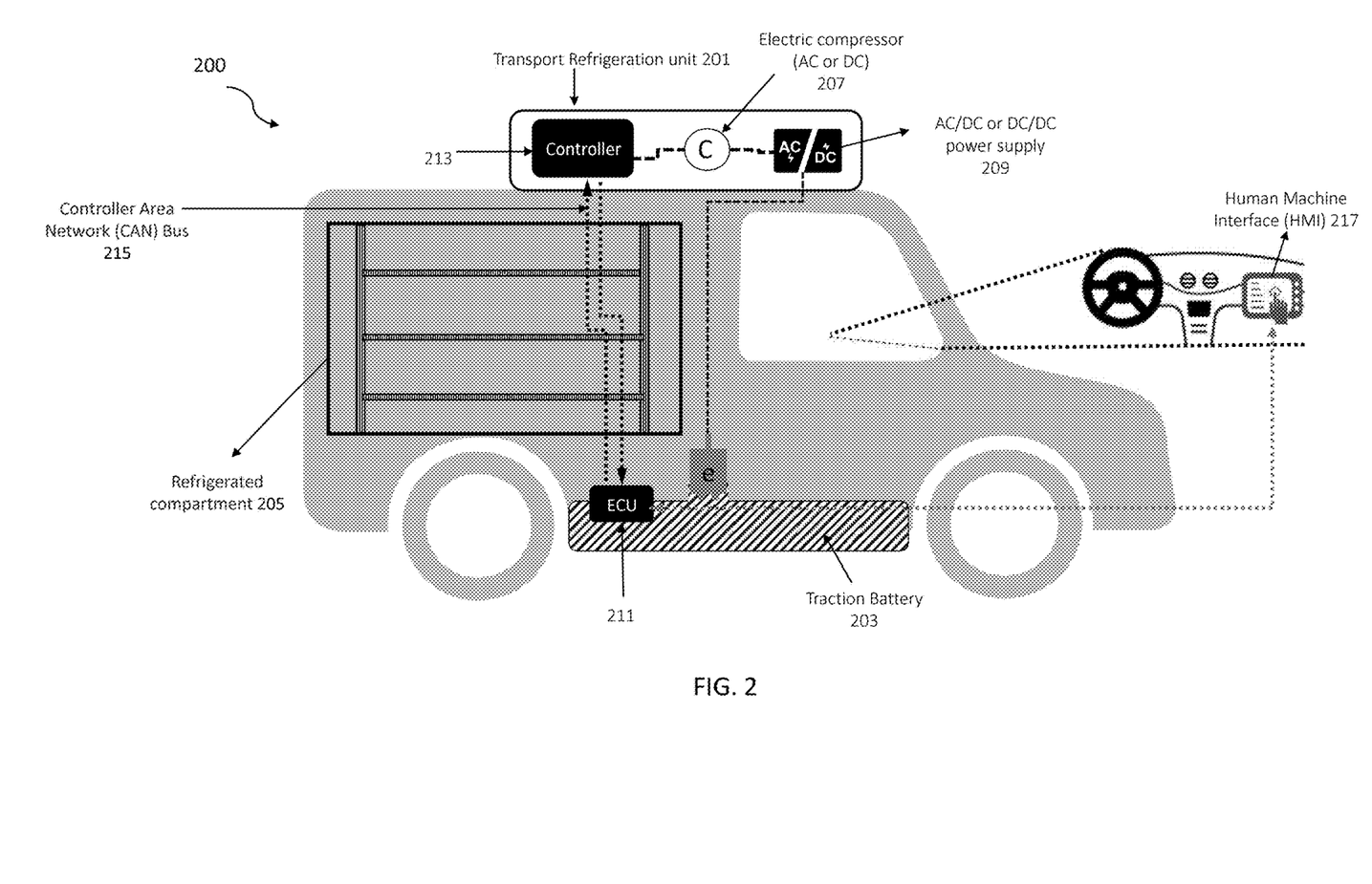
FIG. 2 illustrates a BEV having an electronic control unit (ECU) connected to a TRU.

FIG. 2 illustrates a BEV 200 having an electronic control unit (ECU) 211 with a TRU 201, in accordance with an embodiment of the present disclosure. The BEV 200 includes a traction battery 203 for providing motive power to the BEV 200 during a driving mode of operation of the BEV 200.

The traction battery 203 is configured to provide power to the BEV 200 during the driving period, such as a time period of up to 5 to 10 hours, or a distance range of 50 to 300 miles depending on the capacity of the traction battery 203. The traction battery 203 is configurable to be charged when connected to a power source. The traction battery 203 can also be referred to as "an energy storage unit" without any deviation from the scope of the disclosure.

The BEV 200 further comprises a refrigerated compartment 205. The TRU 201 comprises an electric compressor 207 and the TRU 101 is configured to cool the refrigerated compartment 205. The electric compressor 207 may correspond to a cooling compressor. In addition to the electric compressor 207, the TRU 201 may also comprise a cooling fan to cool the refrigerated compartment 205, and a heating device for defrosting and heating the refrigerated compartment 205. The heating device may correspond to at least one of the compressor or an electrical heater.

During the driving mode of operation of the BEV 200, when the traction battery 203 provides motive power to the BEV 200, the traction battery 203 also provides power to the TRU 201 through a power supply 209, so that the TRU 201 can maintain a temperature of the refrigerated compartment 205.

The BEV 200 operates in a similar manner as the conventional battery electric vehicle as described above but differs in the following aspects described below.

The BEV 200 comprises the ECU 211. The ECU 211 may comprise one or more controllers (although not shown in FIG. 2) configured to control the overall operation mode of the BEV 200.

The TRU 201 further comprises a power supply system including AC/DC or DC/DC power supply 209 for powering the electric compressor 207. The power supply system 209 comprises a controller 213 configured to control the operation of the power supply system 209 to provide power to the electric compressor 207 and the cooling fan. The controller 213 is configured to operate the power supply system 209 to continuously draw power from the traction battery 203 to operate the electric compressor 207 and the cooling fan to maintain a temperature environment within the refrigerated compartment 205. The controller 213 is configured to communicate with the ECU 211 via a Controller Area Network (CAN) bus 215. The CAN bus 215 is commonly used in relation to vehicle systems and, advantageously, the controller 213 of the power supply system 209 can make use of a pre-existing bus connection of the BEV 200.

The TRU 201 may also include a plurality of sensors to measure temperature and pressure inside the refrigeration compartment 205. The plurality of sensors may include, but are not limited to, a compressor discharge and suction pressure measurement sensors, temperature sensors, evaporator leaving temperature sensors and supply, return, and ambient air temperature sensors.

The ECU 211 may further comprise a transceiver (e.g., a communication interface shown in FIG. 6) for obtaining historical information from a database. The historical information is associated with the operation modes activated by the user or the ECU 211 in the past or the rate of energy consumption in the past in the activated operation modes.

The BEV 200 may further comprise a Human Machine Interface (HMI) 217 configured to display messages or notifications in various operation modes of the BEV under the control of ECU 211. Further, the ECU 211 is configured to receive user input via the HMI 217 when the user interacts with the HMI 217.

Figure 3:
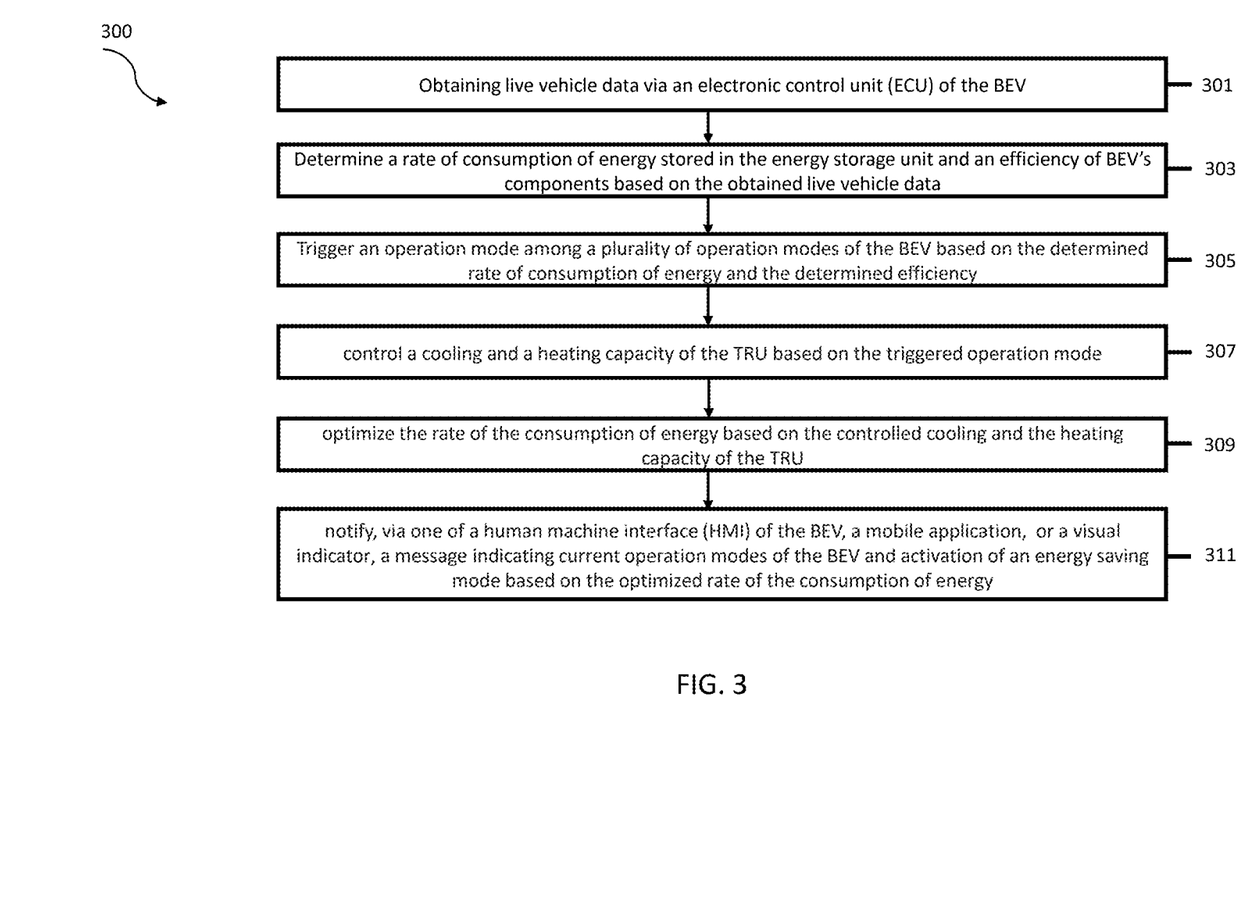
FIG. 3 illustrates a flowchart of method steps for managing mileage capacity of the BEV by optimizing a rate of the consumption of energy associated with the TRU of the BEV.

FIG. 3 illustrates a flowchart of method steps for managing mileage capacity of the BEV 200 by optimizing a rate of the consumption of energy associated with the TRU 201 of the BEV 200. FIG. 3 depicts a method 300 that is executed by the one or more controllers of the ECU 211 of FIG. 2 of the drawings. For ease of explanation, "the controller of the ECU 211" is used for describing the controlling operations of the BEV 200.

At step 301 of method 300, the controller of the ECU 211 obtains live vehicle data including at least a state of charge of the traction battery 203 of the BEV 200, a state of available energy in the traction battery 203, each of a power limitation maximum current and a power limitation maximum voltage of the traction battery 203, a live speed of the BEV 200, cruise control information associated with the BEV 200, health status of the traction battery 203, and power drawn by the BEV 200 on the traction battery 203. The cruise control information associated with the BEV 200 corresponds to information related to at least a rate of acceleration of the BEV 200, a braking pattern associated with the brakes applied by a user of the BEV 200 (i.e., a driver driving the BEV 200), and a driving mode of the BEV 200 that is set by the user. The flow of the method 300 now proceeds to (step 303).

At step 303, the controller of the ECU 211 determines a rate of consumption of energy stored in the traction battery 203 and an efficiency of BEV components based on the obtained live vehicle data. The flow of the method 300 now proceeds to (step 305).

Figure 4A:
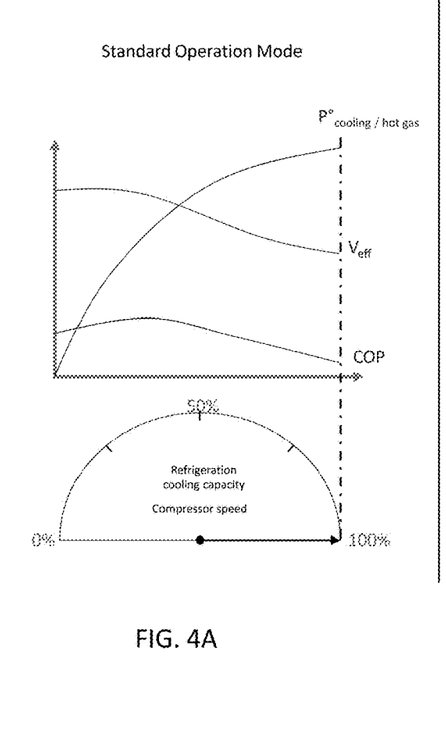
FIGS. 4A, 4B, and 4C illustrate the working of the TRU in a standard operation mode, a derated operation mode, and a critical operation mode of the BEV, respectively.
Figure 4B:
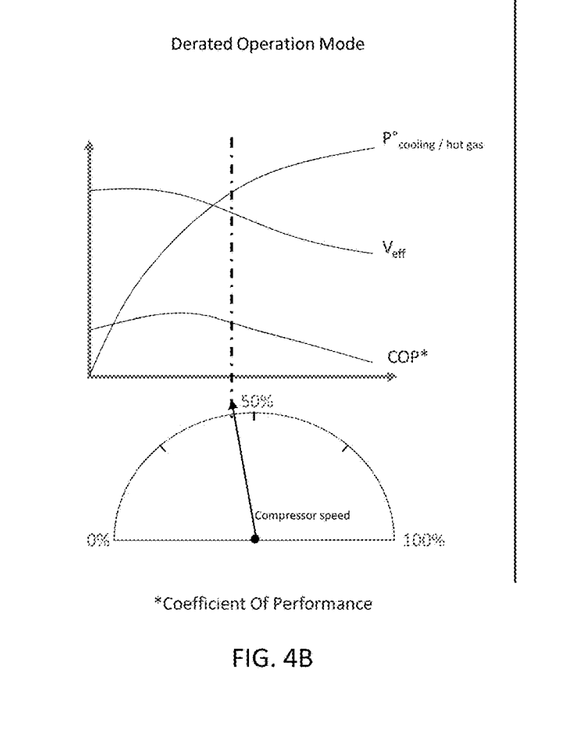
Figure 4C:
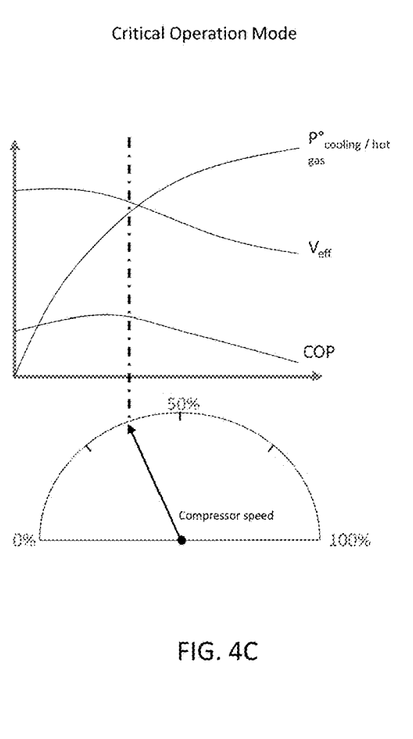

At step 305, after the determination of the rate of the consumption of energy stored in the traction battery 203, the controller of the ECU 211 triggers an operation mode among a plurality of operation modes of the BEV 200 based on each of the determined rate of consumption of energy stored in the traction battery 203 and the determined efficiency of the BEV components. The plurality of operation modes of the BEV 200 includes, but is not limited to, a standard operation mode, a derated operation mode, and a critical operation mode (as shown in FIGS. 4A, 4B, and 4C, respectively). The standard operation mode is an operation in which the electric compressor 207 runs at a full speed capacity. The derated operation mode and the critical operation mode are operation modes where the rate of the consumption of energy of the traction battery 203 needs to be optimized. As an example, based on the determined rate of consumption of energy stored in the traction battery 203 and the determined efficiency of the BEV components, the controller of the ECU 211 activates one of these operation modes of the BEV 200. The flow of the method 300 now proceeds to (step 307).

At step 307, once one of the operation modes among the plurality of operation modes is triggered, the controller of the ECU 211 controls the cooling and heating capacity of the TRU 201 based on the triggered operation mode. The controlling of the cooling and the heating capacity of the TRU 201 includes controlling the speed of at least one of the cooling compressor, the cooling fan, or the heating device of the TRU 201.

The controlling of the cooling and the heating capacity may further include controlling a change in a temperature accuracy setting of the TRU 201 based on the triggered operation mode. Depending on the triggered operation mode, the change in the temperature accuracy setting of the TRU 201 corresponds to a change in a regulation range of the cooling compressor or the heating device of the TRU 201 to a setpoint or above a setpoint within an acceptable setting i.e., a temperature range between predefined setpoints. The predefined setpoints may be set be the user of the BEV.

Figure 5A:
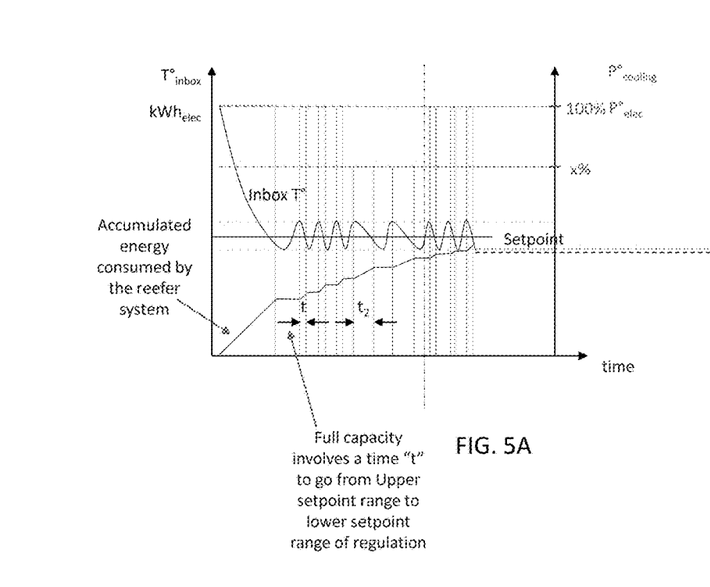
FIGS. 5A and 5B illustrate example profiles of consumption of the BEV in a graphical format.
Figure 5B:
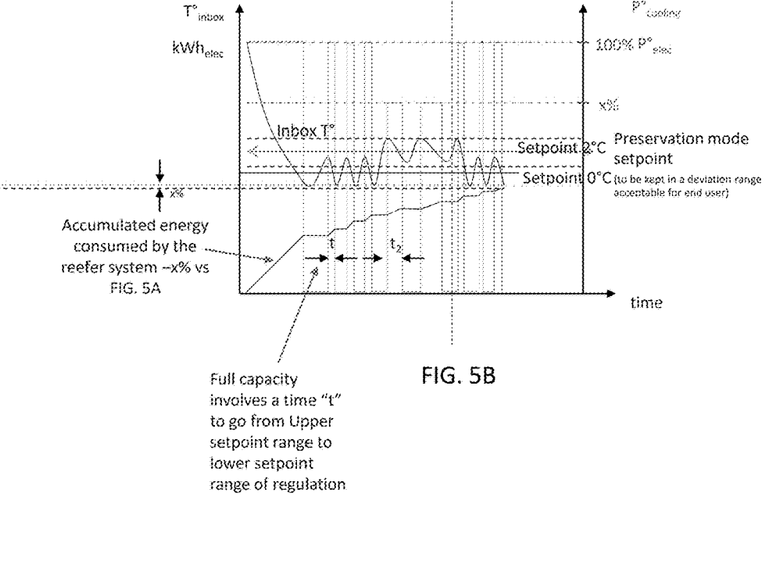

FIGS. 5A and 5B illustrate example profiles of consumption of the BEV 200 indicating a triggered operation mode and the change in the temperature accuracy setting of the TRU 201. As can be seen in FIGS. 5A and 5B, at a time "t" the electric compressor 207 is running on the full capacity involving the time "t" to go from the upper setpoint range to the lower setpoint range of regulation. Further, once the derated mode is triggered based on the obtained vehicle live data, the controller of the ECU 211 activates an Eco mode (a derated mode) leading to a limited % of electrical consumption or cooling capacity at the time "t2". Due to the activation of the Eco mode to the limited % of electrical consumption or cooling capacity, less cooling capacity is required from the TRU 201. Due to this, a longer time is required by the TRU 201 to reach the required temperature of T° of the refrigeration compartment 205. Less power for a longer time still means an equivalent quantity of energy and since the TRU 201 is in a more efficient zone of operation due to the activation of the Eco mode, it will lead to less energy consumed in the end. Also, it can be seen in FIG. 4B, that the speed of the electric compressor 207 is regulated to about half of its capacity to allow a limited percentage of electrical consumption for cooling the refrigerator compartment 205. It is to be noted that the profile of energy consumption of the traction battery 203 of the BEV 200 is shown in FIG. 5A is in reference to the regulated speed of the electric compressor 207 shown in FIG. 4B.

Further, it can be seen in FIG. 4C that the speed of the electric compressor 207 is regulated to less than about half of its capacity to allow a critically low level or very limited percentage of electrical consumption for cooling the refrigerator compartment 205. It is to be noted that the profile of energy consumption of the traction battery 203 of the BEV 200 as shown in FIG. 5B is in reference to the regulated speed of the electric compressor 207 shown in FIG. 4C. In each of the scenarios, as shown in FIGS. 4B and 4C, the temperature efficiency of the TRU 201 is improved.

In particular, the controller 213 under the control instructions of the ECU 211 may control the cooling and the heating capacity of the TRU 201 to maintain the temperature of the refrigeration compartment such that a Coefficient of Performance (COP) of the TRU 201 is improved in one or more operating modes of the BEV or is decreased in the critical operation mode of the BEV. Here, the COP of the TRU 201 corresponds to the energy consumed for maintaining a cooling environment inside the refrigeration compartment.

According to yet another embodiment, the controller 213 under the control instructions of the ECU 211 may adjust a balance between temperature management of the TRU and mileage autonomy of the BEV 200 by adapting the COP of the TRU 201 to its highest efficiency when it is determined that the BEV 200 is consuming a high level of energy from the traction battery 203 in accordance with the triggered operation mode. Further, the controller 213 is configured to maintain a temperature level within the refrigeration compartment 205 at a standard level when it is determined that the BEV 200 conditions are free, and consumption of energy is low in accordance with the triggered operation mode. The flow of the method 300 now proceeds to (step 309).

At step 309, as a result of the control operation of step 307, the rate of the consumption of energy of the traction battery 203 is optimized i.e., a reduction in the rate of the consumption of energy of the traction battery 203. In particular, the rate of the consumption of energy of the traction battery 203 is optimized based on the controlled cooling and the heating capacity of the TRU 201. Due to the optimization of the rate of the consumption of energy of the traction battery 203, the mileage capacity of the BEV 200 will increase, and the BEV can run for a longer distance range in comparison to a distance range before the optimization. The controlled cooling and the heating capacity of the TRU 201 prevents the TRU unit 201 from drawing high power when BEV 200 conditions are at a high level of energy consumption or on a low remaining autonomy i.e., low state of charge of the traction battery 203. The flow of the method 300 now proceeds to (step 311).

At step 311, the controller of the ECU 211 controls the HMI 217 based on the optimized rate of the consumption of energy to send a message, notifying the user of the BEV 200 indicating activation of an energy saving mode. In another scenario, the controller of the ECU 211 may also send a message indicating the current operation modes and the activation of the energy saving mode via one of, but is not limited to, a mobile application using a telematic connection, a visual indicator connected to the TRU, a smart assistant device, a voice output from a sound source. The notification message may indicate an action to be taken by the user while driving the BEV 200. The action indicated by the message may correspond to various types of indications that include, but are not limited to, an indication of a reduction of the live speed of the BEV 200, an indication to recharge the traction battery 203, an indication of a warning regarding spoilage of goods kept in the refrigeration compartment 205 of the TRU 201 due to the optimized rate of the consumption of energy of the traction battery 203. Those skilled in the art will appreciate that the aforementioned notification message examples are merely exemplary and are not intended to limit the scope of the invention.

The notification message may also include information related to the TRU 201 indicating that reducing the speed of the BEV 200 will allow more accurate control of the temperature (like "eco drive") or alert information when the speed of the BEV 200 or energy consumption of the traction battery 203 is too high. With the help of these messages, the user of the BEV can manually control the operation of the BEV 200 and may ensure a time at which the traction battery 203 of the BEV needs to be charged.

According to an embodiment, by the way of the controlling method to control the cooling capacity of the TRU 201, a minimum cold chain may be preserved even when there is a low level of state of charge of the traction battery 203 is determined.

Figure 6:
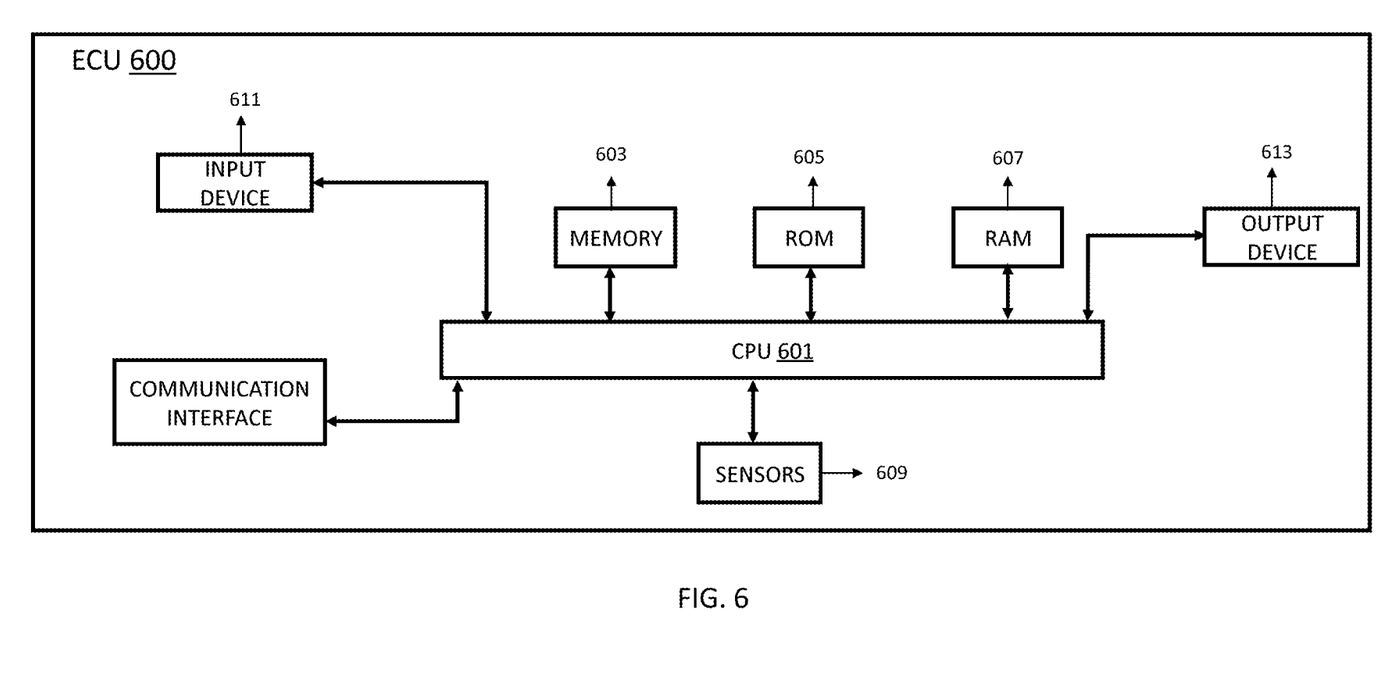
FIG. 6 illustrates an exemplary hardware configuration of the ECU.

FIG. 6 illustrates an exemplary hardware configuration of the ECU. The ECU 600 is similar in functionality to that of the ECU 211 of FIG. 2.

The ECU 600 includes a controlling unit (CPU 601) that controls various system components including the system memory 603 such as read-only memory (ROM) 605 and random-access memory (RAM) 607. The ECU 600 further includes one or more sensors 609 configured to measure the temperature inside the BEV 200, pressure of the tires of the BEV 200, speed of BEV 200, and the like. The one or more sensors 609 may include but are not limited to, temperature sensors, acceleration sensors, motion sensors, gyro sensors, oxygen sensor, air index measurement sensor, intake air temperature sensors, engine coolant temperature sensors, and the like.

The ECU 600 may also include a cache of high-speed memory connected directly with, in close proximity to, or integrated as part of the CPU 601. The CPU 601 copies data from the memory 603 to the cache for quick access. The CPU 601 may essentially be a completely self-contained computing system, containing multiple cores or processors, a bus, memory controller, cache, etc. (such as a system-on-chip). A multi-core processor may be symmetric or asymmetric.

The ECU 600 may also include a system bus that may be any of several types of bus structures including a memory bus or memory controller, a peripheral bus, and a local bus using any of a variety of bus architectures. The ECU 601 may further include a storage device such as a hard disk drive, a magnetic disk drive, an optical disk drive, a tape drive, a solid-state drive, or the like. The storage device can include software modules that can be controlled and executed by the CPU 601. Other hardware or software modules are contemplated. The storage device may be connected to the ECU 600 by a drive interface. The drives and the associated computer-readable storage media provide nonvolatile storage of computer-readable instructions, data structures, program modules, and other data for the ECU. In one aspect, a hardware module that performs a particular function includes the software component stored in a tangible computer-readable storage medium in connection with the necessary hardware components, such as the CPU 601, input device 611, output device 613, and so forth, to carry out the operations of the BEV 200. The basic components and appropriate variations are contemplated depending on the type of BEVs.

The ECU 601 may also include a communication interface 615. The communication interface 615 may be connected to a network such as a wireless network. The wireless network may be a cellular telephone network, an IEEE 802.11, 802.16, 802.20, 802.1Q or WiMax network. Further, the network may be a public network, such as the internet, a private network, such as an intranet, or combinations thereof, and may utilize a variety of networking protocols now available or later developed including, but not necessarily limited to including TCP/IP based networking protocols.

The communication interface 615 may include a transceiver including a transmitter and a receiver for receiving or transmitting data from or to a cloud network used in V2V communication.

As would be apparent to a person in the art, various working modifications may be made to the method in order to implement the inventive concept as taught herein.

Moreover, the actions of any flow diagram need not be implemented in the order shown; nor do all of the acts necessarily need to be performed. Also, those acts that are not dependent on other acts may be performed in parallel with the other acts.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for managing mileage capacity of a battery electric vehicle (BEV) having a transport refrigeration unit (TRU), comprising:

obtaining, via an electronic control unit (ECU) of the BEV, live vehicle data including at least a state of charge of an energy storage unit of the BEV, a state of available energy in the energy storage unit, each of a power limitation maximum current and a power limitation maximum voltage of the energy storage unit, a live speed of the BEV, cruise control information associated with the BEV, health status of the energy storage unit, and power drawn by the BEV on the energy storage unit;

determining a rate of consumption of energy stored in the energy storage unit and an efficiency of BEV's components based on the obtained live vehicle data;

triggering an operation mode among a plurality of operation modes of the BEV based on each of the determined rate of consumption of energy and the efficiency of BEV components;

controlling a cooling and a heating capacity of the TRU based on the triggered operation mode;

optimizing the rate of the consumption of energy based on the controlled cooling and the heating capacity of the TRU; and notifying, based on the optimized rate of the consumption of energy via one of a human machine interface (HMI)

of the BEV, a mobile application, or a visual indicator connected to the TRU, a message indicating current operating modes of the BEV and activation of an energy saving mode.

2. The method as claimed in claim 1, further comprising: controlling, based on the triggered operation mode, a speed of at least one of a cooling compressor, a cooling fan, or a heating device included in the TRU, wherein controlling the speed comprises regulating the speed of the cooling compressor to half of maximum capacity of the cooling compressor based on the triggered operation mode; and
optimizing the rate of the consumption of energy based on the controlled speed of the at least one of the cooling compressor, the cooling fan, or the heating device.

3. The method as claimed in claim 1, further comprising: controlling a change in a temperature accuracy setting of the TRU based on the triggered operation mode; and
optimizing the rate of the consumption of energy based on the controlled change in the temperature accuracy setting of the TRU.

4. The method as claimed in claim 3, wherein the change in the temperature accuracy setting of the TRU corresponds to a change in a regulation range of the at least one of a cooling compressor or a heating device of the TRU above a setpoint within an acceptable setting predefined by a user of the BEV.

5. The method as claimed in claim 1, wherein the plurality of operation modes includes at least one of a derated operation mode or a critical operation mode.

6. The method as claimed in claim 1,
wherein the message further indicates an action to be taken by a user while driving the BEV, and
wherein the action indicated by the message corresponds to at least one of an indication of a modulation of the live speed of the BEV between at least two different non-zero speeds, an indication to recharge the energy storage unit, or an indication of a warning regarding spoilage of goods kept in a refrigeration compartment of the TRU due to the optimized rate of the consumption of energy.

7. The method as claimed in claim 1, wherein the cooling and the heating capacity of the TRU is controlled such that a coefficient of performance (COP) of the TRU is improved in one or more operating modes of the BEV or is decreased in a critical operation mode of the BEV.

8. The method as claimed in claim 7, further comprising: adjusting a balance between temperature management of the TRU and autonomy of the BEV by adapting to the COP.

9. The method as claimed in claim 1, wherein the cruise control information corresponds to information related to at least a rate of acceleration of the BEV, a braking pattern associated with the brakes applied by the user, and a driving mode of the BEV that is set by the user.

10. The method as claimed in claim 1, further comprising notifying the message the mobile application using a telematic connection.

11. A system for managing mileage capacity of a battery electric vehicle (BEV), comprising:
an electronic control unit ECU including a transceiver and at least one controller; an energy storage unit including one or more batteries; and
a transport refrigeration unit (TRU), wherein the at least one controller is configured to:
obtain, via the transceiver of the ECU, live vehicle data including at least a state of charge of the energy storage unit, a state of available energy in the energy storage unit, each of a Power limitation maximum current and a power limitation maximum voltage of the energy storage unit, a live speed of the BEV, cruise control information associated with the BEV, health status of the energy storage unit, and power drawn by the BEV on the energy storage unit;
determine a rate of consumption of energy stored in the energy storage unit and an efficiency of BEV's components based on the obtained live vehicle data;
trigger an operation mode among a plurality of operation modes of the BEV based on each of the determined rate of consumption of energy and the efficiency of BEV components;
control a cooling and a heating capacity of the TRU based on the triggered operation mode;
optimize the rate of the consumption of energy based on the controlled cooling and the heating capacity of the TRU; and
control, based on the optimized rate of the consumption of energy, one of a human machine interface (HMI), a mobile application via a telematic connection, or a visual indicator connected to the TRU to notify a message indicating current operating modes of the BEV and activation of an energy saving mode.

12. The system as claimed in claim 11,
wherein the TRU comprises a cooling compressor, a cooling fan, and a heating device,
wherein the heating device may correspond to at least one of a compressor or an electrical heater, and
wherein the at least one controller is further configured to:
control a speed of at least one of the cooling compressor, the cooling fan, or the heating device based on the triggered operation mode, wherein to control the speed, the controller is configured to regulate the speed of the cooling compressor to half of maximum capacity of the cooling compressor based on the triggered operation mode; and
optimize the rate of the consumption of energy based on the controlled speed of the at least one cooling compressor, the cooling fan, or the heating device.

13. The system as claimed in claim 11, wherein the at least one controller is further configured to:
control a change in a temperature accuracy setting of the TRU based on the triggered operation mode; and
optimize the rate of the consumption of energy based on the controlled change in the temperature accuracy setting of the TRU.

14. The system as claimed in claim 13, wherein the change in the temperature accuracy setting of the TRU corresponds to a change in a regulation range of the at least one of a cooling compressor or a heating device of the TRU above a setpoint within an acceptable setting predefined by a user of the BEV.

15. The system as claimed in claim 11, wherein the plurality of operation modes includes at least one of a derated operation mode or a critical operation mode.

16. The system as claimed in claim 11,
wherein the message further indicates an action to be taken by a user while driving the BEV, and
wherein the action indicated by the message corresponds to at least one of an indication of a modulation of the live speed of the BEV between at least two different non-zero speeds, an indication to recharge the energy storage unit, or an indication of a warning regarding spoilage of goods kept in the TRU due to the optimized rate of the consumption of energy.

17. The system as claimed in claim 11, wherein the at least one controller is further configured to control the cooling and the heating capacity of the TRU such that a Coefficient of Performance (COP) of the TRU is improved in one or more operating modes of the BEV or is decreased in a critical operation mode of the BEV.

18. The system as claimed in claim 17, wherein the at least one controller is further configured to adjust a balance between temperature management of the TRU and autonomy of the BEV by adapting to the COP.

19. The system as claimed in claim 11, wherein the cruise control information corresponds to information related to at least a rate of acceleration of the BEV, a braking pattern associated with the brakes applied by the user, and a driving mode of the BEV that is set by the user.

20. The method as claimed in claim 6, wherein the action indicated by the message corresponds to the indication of a modulation of the live speed of the BEV between at least two different non-zero speeds.

* * * * *